(12) United States Patent
Basir

(10) Patent No.: US 9,978,272 B2
(45) Date of Patent: May 22, 2018

(54) VEHICLE TO VEHICLE CHATTING AND COMMUNICATION SYSTEM

(75) Inventor: Otman A. Basir, Waterloo (CA)

(73) Assignee: RIDETONES, INC, Waterloo (CA)

( * ) Notice: Subject to any disclaimer, the term of this patent is extended or adjusted under 35 U.S.C. 154(b) by 528 days.

(21) Appl. No.: 12/954,084

(22) Filed: Nov. 24, 2010

(65) Prior Publication Data

US 2011/0121991 A1    May 26, 2011

Related U.S. Application Data

(60) Provisional application No. 61/264,487, filed on Nov. 25, 2009.

(51) Int. Cl.
| | |
|---|---|
| *G08G 1/0962* | (2006.01) |
| *G08G 1/0967* | (2006.01) |
| *G08G 1/00* | (2006.01) |
| *G10L 13/00* | (2006.01) |
| *G10L 15/26* | (2006.01) |

(52) U.S. Cl.
CPC ..... *G08G 1/0962* (2013.01); *G08G 1/096716* (2013.01); *G08G 1/096741* (2013.01); *G08G 1/096791* (2013.01); *G08G 1/20* (2013.01); *G10L 13/00* (2013.01); *G10L 15/26* (2013.01)

(58) Field of Classification Search
CPC .. G08G 1/096; G08G 1/09623; G08G 1/0965; G08G 1/0967; G08G 1/096725
USPC .................................................. 340/426.16
See application file for complete search history.

(56) References Cited

U.S. PATENT DOCUMENTS

| | | |
|---|---|---|
| 3,928,724 A | 12/1975 | Andersen et al. |
| 4,083,003 A | 4/1978 | Haemmig et al. |
| 4,532,052 A | 7/1985 | Weaver et al. |
| 4,591,823 A | 5/1986 | Horvat |
| 4,989,144 A | 1/1991 | Barnett et al. |
| 5,177,685 A | 1/1993 | Davis et al. |
| 5,246,073 A | 9/1993 | Sandiford et al. |
| 5,488,360 A | 1/1996 | Ray |
| 5,638,425 A | 6/1997 | Meador et al. |
| 5,760,742 A | 6/1998 | Branch et al. |
| 5,836,392 A | 11/1998 | Urlwin-Smith |
| 5,912,951 A | 6/1999 | Checchio et al. |
| 5,931,907 A | 8/1999 | Davies et al. |
| 5,938,706 A | 8/1999 | Feldman et al. |
| 5,944,783 A | 8/1999 | Nieten |
| 5,963,618 A | 10/1999 | Porter |
| 5,983,108 A | 11/1999 | Kennedy et al. |
| 6,012,030 A | 1/2000 | French et al. |
| 6,041,300 A | 3/2000 | Ittycheriah et al. |

(Continued)

FOREIGN PATENT DOCUMENTS

| | | |
|---|---|---|
| CA | 2405813 A1 | 11/2001 |
| DE | 19920227 A1 | 11/2000 |

(Continued)

*Primary Examiner* — Hai Phan
*Assistant Examiner* — Son M Tang
(74) *Attorney, Agent, or Firm* — Carlson, Gaskey & Olds, P.C.

(57) ABSTRACT

A vehicle communication system includes a plurality of user accounts, each user account corresponding to a user. A server is programmed to receive communication invitations from inviting vehicles, and is programmed to transmit the communication invitations to invitee vehicles to facilitate inter-vehicle communication.

18 Claims, 3 Drawing Sheets

(56) References Cited

U.S. PATENT DOCUMENTS

| | | | |
|---|---|---|---|
| 6,061,718 A | 5/2000 | Nelson | |
| 6,088,650 A | 7/2000 | Schipper et al. | |
| 6,147,598 A | 11/2000 | Murphy et al. | |
| 6,176,315 B1 | 1/2001 | Reddy et al. | |
| 6,192,364 B1 | 2/2001 | Baclawski | |
| 6,192,986 B1 | 2/2001 | Urlwin-Smith | |
| 6,196,317 B1 | 3/2001 | Hardy | |
| 6,212,474 B1 | 4/2001 | Fowler et al. | |
| 6,253,122 B1 * | 6/2001 | Razavi et al. | 701/1 |
| 6,282,495 B1 | 8/2001 | Kirkhart et al. | |
| 6,289,332 B2 * | 9/2001 | Menig et al. | 180/167 |
| 6,295,449 B1 | 9/2001 | Westerlage et al. | |
| 6,356,869 B1 | 3/2002 | Chapados et al. | |
| 6,362,748 B1 * | 3/2002 | Huang | 340/901 |
| 6,366,651 B1 | 4/2002 | Griffith et al. | |
| 6,367,022 B1 | 4/2002 | Gillespie et al. | |
| 6,377,825 B1 | 4/2002 | Kennedy et al. | |
| 6,385,202 B1 | 5/2002 | Katseff et al. | |
| 6,529,863 B1 | 3/2003 | Ball et al. | |
| 6,553,102 B1 | 4/2003 | Fogg et al. | |
| 6,574,531 B2 | 6/2003 | Tan et al. | |
| 6,580,973 B2 | 6/2003 | Leivian et al. | |
| 6,594,557 B1 | 7/2003 | Stefan et al. | |
| 6,607,035 B1 | 8/2003 | Reddy et al. | |
| 6,615,130 B2 | 9/2003 | Myr | |
| 6,622,083 B1 | 9/2003 | Knockeart et al. | |
| 6,650,997 B2 | 11/2003 | Funk | |
| 6,690,268 B2 | 2/2004 | Schofield et al. | |
| 6,697,638 B1 | 2/2004 | Larsson et al. | |
| 6,714,223 B2 | 3/2004 | Asami et al. | |
| 6,721,633 B2 | 4/2004 | Funk et al. | |
| 6,724,863 B1 | 4/2004 | Bedingfield | |
| 6,731,239 B2 | 5/2004 | Wall et al. | |
| 6,738,742 B2 | 5/2004 | Smith et al. | |
| 6,748,211 B1 | 6/2004 | Isaac et al. | |
| 6,764,981 B1 | 7/2004 | Eoff et al. | |
| 6,788,935 B1 | 9/2004 | McKenna et al. | |
| 6,788,949 B1 * | 9/2004 | Bansal | 455/519 |
| 6,812,888 B2 | 11/2004 | Drury et al. | |
| 6,812,942 B2 | 11/2004 | Ribak | |
| 6,839,669 B1 | 1/2005 | Gould et al. | |
| 6,842,510 B2 | 1/2005 | Sakamoto | |
| 6,895,084 B1 | 5/2005 | Saylor et al. | |
| 6,895,257 B2 | 5/2005 | Boman et al. | |
| 6,895,310 B1 | 5/2005 | Kolls | |
| 6,909,947 B2 | 6/2005 | Douros et al. | |
| 6,925,154 B2 | 8/2005 | Gao et al. | |
| 6,944,679 B2 | 9/2005 | Parupudi et al. | |
| 6,968,272 B2 | 11/2005 | Knockeart et al. | |
| 6,970,703 B2 | 11/2005 | Fuchs et al. | |
| 6,970,783 B2 | 11/2005 | Knockeart et al. | |
| 6,972,669 B2 | 12/2005 | Saito et al. | |
| 6,982,635 B2 | 1/2006 | Obradovich | |
| 7,039,166 B1 | 5/2006 | Peterson et al. | |
| 7,049,982 B2 | 5/2006 | Sleboda et al. | |
| 7,050,834 B2 | 5/2006 | Harwood et al. | |
| 7,062,286 B2 | 6/2006 | Grivas et al. | |
| 7,069,118 B2 | 6/2006 | Coletrane et al. | |
| 7,085,629 B1 | 8/2006 | Gotou et al. | |
| 7,091,160 B2 | 8/2006 | Dao et al. | |
| 7,092,723 B2 * | 8/2006 | Himmelstein | 455/456.1 |
| 7,113,911 B2 | 9/2006 | Hinde et al. | |
| 7,117,075 B1 | 10/2006 | Larschan et al. | |
| 7,123,926 B2 * | 10/2006 | Himmelstein | 455/456.1 |
| 7,127,271 B1 | 10/2006 | Fujisaki | |
| 7,151,997 B2 | 12/2006 | Uhlmann et al. | |
| 7,191,040 B2 | 3/2007 | Pajakowski et al. | |
| 7,191,059 B2 | 3/2007 | Asahara | |
| 7,200,409 B1 * | 4/2007 | Ichikawa et al. | 455/456.1 |
| 7,212,814 B2 | 5/2007 | Wilson et al. | |
| 7,228,224 B1 | 6/2007 | Rosen et al. | |
| 7,257,426 B1 | 8/2007 | Witkowski et al. | |
| 7,280,975 B1 | 10/2007 | Donner | |
| 7,286,825 B2 * | 10/2007 | Shishido et al. | 455/435.1 |
| 7,286,857 B1 | 10/2007 | Walker et al. | |
| 7,289,796 B2 | 10/2007 | Kudoh | |
| 7,296,066 B2 | 11/2007 | Lehaff et al. | |
| 7,346,374 B2 | 3/2008 | Witkowski et al. | |
| 7,356,474 B2 * | 4/2008 | Kumhyr | 704/275 |
| 7,363,229 B2 | 4/2008 | Falcon et al. | |
| 7,366,795 B2 | 4/2008 | O'Neil et al. | |
| 7,386,376 B2 | 6/2008 | Basir et al. | |
| 7,400,879 B2 | 7/2008 | Lehaff et al. | |
| 7,412,078 B2 * | 8/2008 | Kim | 382/105 |
| 7,412,328 B2 | 8/2008 | Uhlmann et al. | |
| 7,426,647 B2 | 9/2008 | Fleck et al. | |
| 7,444,286 B2 | 10/2008 | Roth et al. | |
| 7,460,028 B2 * | 12/2008 | Garibotto et al. | 340/937 |
| 7,461,344 B2 | 12/2008 | Young et al. | |
| 7,496,514 B2 | 2/2009 | Ross et al. | |
| 7,505,951 B2 | 3/2009 | Thompson et al. | |
| 7,526,431 B2 | 4/2009 | Roth et al. | |
| 7,554,435 B2 * | 6/2009 | Tengler et al. | 340/436 |
| 7,567,542 B2 | 7/2009 | Rybak et al. | |
| 7,643,619 B2 | 1/2010 | Jung | |
| 7,646,296 B2 | 1/2010 | Ohki | |
| 7,653,545 B1 | 1/2010 | Starkie | |
| 7,689,253 B2 | 3/2010 | Basir | |
| 7,693,720 B2 | 4/2010 | Kennewick et al. | |
| 7,769,364 B2 | 8/2010 | Logan et al. | |
| 7,787,907 B2 | 8/2010 | Zeinstra et al. | |
| 7,801,283 B2 | 9/2010 | Harwood et al. | |
| 7,814,353 B2 | 10/2010 | Naitou et al. | |
| 7,859,392 B2 | 12/2010 | McClellan et al. | |
| 7,865,309 B2 * | 1/2011 | Taylor | 701/301 |
| 7,881,864 B2 | 2/2011 | Smith | |
| 7,912,186 B2 | 3/2011 | Howell et al. | |
| 7,948,969 B2 | 5/2011 | Boys | |
| 7,983,811 B2 | 7/2011 | Basir et al. | |
| 8,015,010 B2 | 9/2011 | Basir | |
| 8,060,285 B2 | 11/2011 | Chigusa | |
| 8,090,848 B2 | 1/2012 | Maes et al. | |
| 8,195,467 B2 | 6/2012 | Mozer et al. | |
| 8,218,737 B2 * | 7/2012 | Odinak | 379/88.22 |
| 8,289,186 B2 * | 10/2012 | Osafune | 340/903 |
| 8,331,279 B2 * | 12/2012 | Preston et al. | 370/313 |
| 8,350,721 B2 * | 1/2013 | Carr | 340/903 |
| 8,712,757 B2 * | 4/2014 | Hamilton, II | H04L 41/00 379/93.01 |
| 2001/0005854 A1 | 6/2001 | Murata et al. | |
| 2001/0021640 A1 | 9/2001 | Lappe | |
| 2001/0056345 A1 | 12/2001 | Guedalia | |
| 2002/0032042 A1 | 3/2002 | Poplawsky et al. | |
| 2002/0041659 A1 | 4/2002 | Beswick | |
| 2003/0114202 A1 | 6/2003 | Suh et al. | |
| 2003/0181543 A1 | 9/2003 | Reddy et al. | |
| 2003/0227390 A1 | 12/2003 | Hung et al. | |
| 2003/0231550 A1 | 12/2003 | MacFarlane | |
| 2004/0001575 A1 | 1/2004 | Tang | |
| 2004/0058647 A1 | 3/2004 | Zhang et al. | |
| 2004/0082340 A1 * | 4/2004 | Eisinger | 455/456.1 |
| 2004/0090950 A1 | 5/2004 | Lauber et al. | |
| 2004/0102188 A1 | 5/2004 | Boyer et al. | |
| 2004/0104808 A1 * | 6/2004 | Khoshbin | 340/7.5 |
| 2004/0104842 A1 | 6/2004 | Drury et al. | |
| 2004/0116106 A1 | 6/2004 | Shishido et al. | |
| 2004/0133345 A1 | 7/2004 | Asahara | |
| 2004/0145457 A1 | 7/2004 | Schofield et al. | |
| 2004/0158367 A1 | 8/2004 | Basu et al. | |
| 2004/0182576 A1 | 9/2004 | Reddy et al. | |
| 2004/0185915 A1 | 9/2004 | Ihara et al. | |
| 2004/0193420 A1 | 9/2004 | Kennewick et al. | |
| 2004/0243406 A1 | 12/2004 | Rinscheid | |
| 2004/0257210 A1 | 12/2004 | Chen et al. | |
| 2005/0046584 A1 | 3/2005 | Breed | |
| 2005/0049781 A1 | 3/2005 | Oesterling | |
| 2005/0054386 A1 | 3/2005 | Chung | |
| 2005/0066207 A1 | 3/2005 | Fleck et al. | |
| 2005/0088320 A1 | 4/2005 | Kovach | |
| 2005/0107132 A1 | 5/2005 | Kamdar et al. | |
| 2005/0107944 A1 | 5/2005 | Hovestadt et al. | |
| 2005/0130631 A1 | 6/2005 | Maguire et al. | |
| 2005/0131677 A1 | 6/2005 | Assadollahi | |
| 2005/0135573 A1 | 6/2005 | Harwood et al. | |

(56) References Cited

U.S. PATENT DOCUMENTS

| | | |
|---|---|---|
| 2005/0143134 A1 | 6/2005 | Harwood et al. |
| 2005/0174217 A1 | 8/2005 | Basir et al. |
| 2005/0230434 A1 | 10/2005 | Campbell et al. |
| 2005/0285743 A1 | 12/2005 | Weber |
| 2005/0288190 A1 | 12/2005 | Dao et al. |
| 2006/0009885 A1 | 1/2006 | Raines |
| 2006/0030298 A1 | 2/2006 | Burton et al. |
| 2006/0052921 A1 | 3/2006 | Bodin et al. |
| 2006/0055565 A1 | 3/2006 | Kawamata et al. |
| 2006/0089754 A1 | 4/2006 | Mortenson |
| 2006/0101311 A1 | 5/2006 | Lipscomb et al. |
| 2006/0120343 A1* | 6/2006 | O'Brien et al. .............. 370/351 |
| 2006/0214783 A1 | 9/2006 | Ratnakar |
| 2006/0217858 A1 | 9/2006 | Peng |
| 2006/0271275 A1 | 11/2006 | Verma |
| 2007/0016813 A1 | 1/2007 | Naitou et al. |
| 2007/0038360 A1 | 2/2007 | Sakhpara |
| 2007/0042812 A1 | 2/2007 | Basir |
| 2007/0043574 A1 | 2/2007 | Coffman et al. |
| 2007/0050108 A1 | 3/2007 | Larschan et al. |
| 2007/0061401 A1 | 3/2007 | Bodin et al. |
| 2007/0073812 A1 | 3/2007 | Yamaguchi |
| 2007/0106739 A1 | 5/2007 | Clark et al. |
| 2007/0118380 A1 | 5/2007 | Konig |
| 2007/0162552 A1* | 7/2007 | Shaffer et al. .............. 709/207 |
| 2007/0285280 A1* | 12/2007 | Robinson et al. .......... 340/928 |
| 2008/0004875 A1 | 1/2008 | Chengalvarayan et al. |
| 2008/0027643 A1 | 1/2008 | Basir et al. |
| 2008/0031433 A1 | 2/2008 | Sapp et al. |
| 2008/0071465 A1 | 3/2008 | Chapman et al. |
| 2008/0119134 A1 | 5/2008 | Rao |
| 2008/0132270 A1 | 6/2008 | Basir |
| 2008/0133230 A1 | 6/2008 | Herforth |
| 2008/0140408 A1 | 6/2008 | Basir |
| 2008/0201135 A1 | 8/2008 | Yano |
| 2008/0252487 A1 | 10/2008 | McClellan et al. |
| 2008/0263451 A1 | 10/2008 | Portele et al. |
| 2008/0270015 A1 | 10/2008 | Ishikawa et al. |
| 2008/0306740 A1 | 12/2008 | Schuck et al. |
| 2009/0011799 A1 | 1/2009 | Douthitt et al. |
| 2009/0085728 A1 | 4/2009 | Catten et al. |
| 2009/0099836 A1 | 4/2009 | Jacobsen et al. |
| 2009/0106036 A1 | 4/2009 | Tamura et al. |
| 2009/0124272 A1 | 5/2009 | White et al. |
| 2009/0161841 A1 | 6/2009 | Odinak |
| 2009/0176522 A1 | 7/2009 | Kowalewski et al. |
| 2009/0204410 A1 | 8/2009 | Mozer et al. |
| 2009/0259349 A1 | 10/2009 | Golenski |
| 2009/0298474 A1 | 12/2009 | George |
| 2009/0318119 A1 | 12/2009 | Basir et al. |
| 2010/0023246 A1 | 1/2010 | Zhao et al. |
| 2010/0036595 A1 | 2/2010 | Coy et al. |
| 2010/0088718 A1* | 4/2010 | Hasek .................. G08B 25/085 725/33 |
| 2010/0097239 A1 | 4/2010 | Campbell et al. |
| 2010/0100307 A1 | 4/2010 | Kim |
| 2010/0130180 A1 | 5/2010 | Lim |
| 2010/0137037 A1 | 6/2010 | Basir |
| 2010/0138140 A1 | 6/2010 | Okuyama |
| 2010/0159968 A1 | 6/2010 | Ng |
| 2010/0198428 A1 | 8/2010 | Sultan et al. |
| 2010/0211301 A1 | 8/2010 | McClellan |
| 2010/0211972 A1* | 8/2010 | Howarter ............. G08B 27/008 725/33 |
| 2010/0222939 A1 | 9/2010 | Namburu et al. |
| 2010/0259370 A1* | 10/2010 | Chen et al. ............... 340/425.5 |
| 2010/0280884 A1 | 11/2010 | Levine et al. |
| 2011/0302253 A1 | 12/2011 | Simpson-Anderson et al. |

FOREIGN PATENT DOCUMENTS

| | | |
|---|---|---|
| DE | 102007062958 A1 | 6/2009 |
| EP | 1191798 | 3/2002 |
| EP | 1286330 | 10/2006 |
| EP | 1568970 B1 | 12/2006 |
| EP | 901000 B1 | 2/2007 |
| EP | 1575225 B1 | 9/2007 |
| EP | 1463345 A3 | 10/2008 |
| EP | 1701247 A3 | 1/2009 |
| EP | 1840523 B1 | 3/2011 |
| EP | 1986170 B1 | 4/2011 |
| GB | 2329970 B | 11/2001 |
| GB | 2366157 B | 2/2003 |

* cited by examiner

VEHICLE TO VEHICLE CHATTING AND COMMUNICATION SYSTEM

This application claims priority to U.S. Provisional Application Ser. No. 61/264,487, filed Nov. 25, 2009.

BACKGROUND

While on the road, people in different vehicles often wish to communicate with each other. The communication may involve driving conditions, vehicle conditions or simply social interaction. However, current communication systems require that one person know the other's phone number or email address for example. For users with shortwave or CB radios, the communication is not directed to a particular user, but is broadcast for anyone else to hear and participate.

SUMMARY

A vehicle communication system includes a plurality of user accounts, each user account corresponding to a user. A server is programmed to receive communication invitations from inviting vehicles, and is programmed to transmit the communication invitations to invitee vehicles to facilitate inter-vehicle communication.

The invitations may be directed to license plate numbers, which the server can translate to a particular user or electronic device. The communication may be between users via the server, such as voice, text or video. Control units at each vehicle may convert user speech to text, which is transmitted via the server to the control unit at the other vehicle, which converts the text back to speech. The server may log or record the communications between the users.

DETAILED DESCRIPTION OF THE PREFERRED EMBODIMENT

Figure 1:
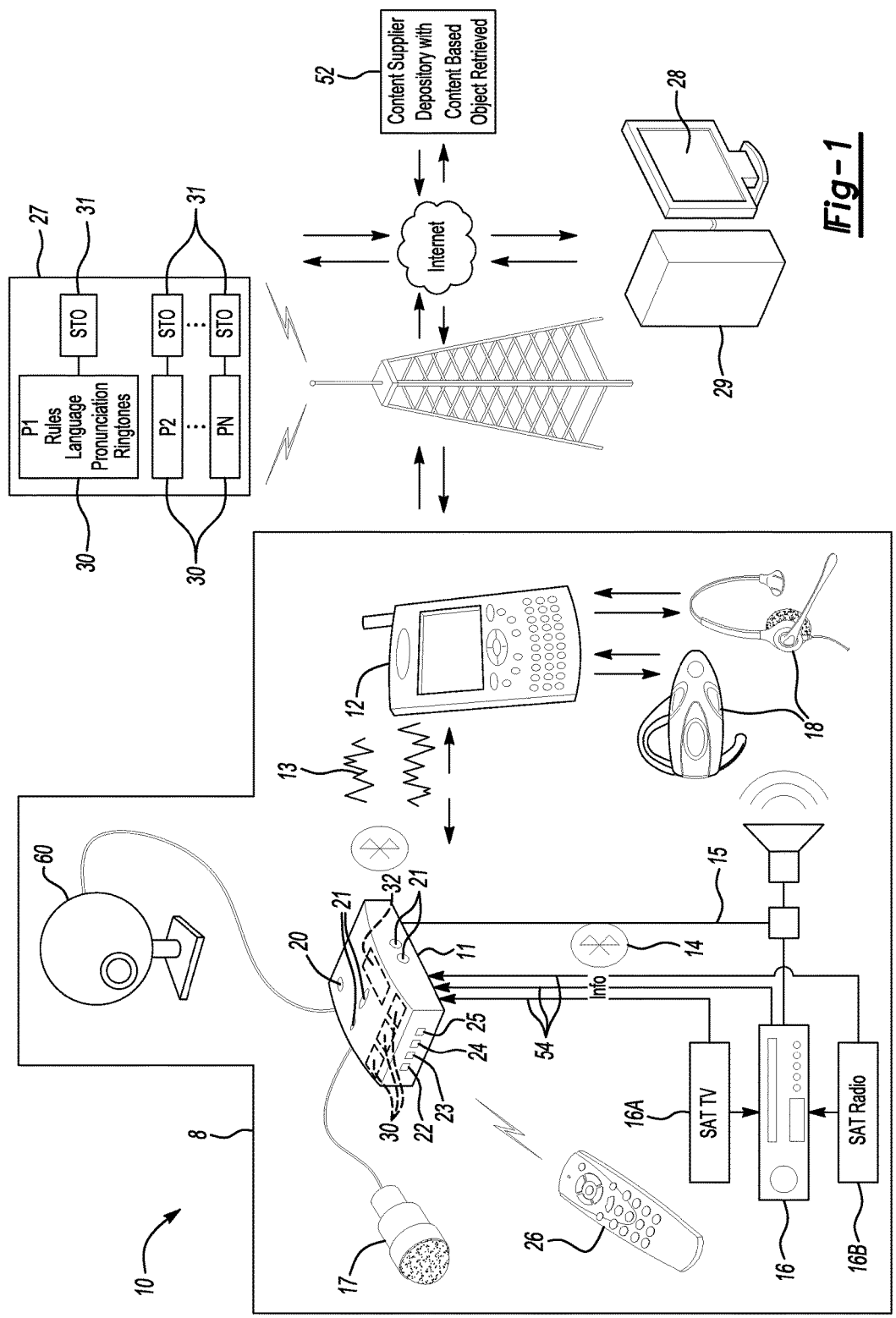
FIG. 1 is a schematic of a communication system according to one embodiment of the present invention installed in a vehicle.

A communication system 10 is shown in FIG. 1 as implemented in a vehicle 8. The system 10 includes a device control unit 11 which is preferably mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile device 12. All data 13 is encrypted prior to transmission. The audio output of the control unit 11 is transmitted either wirelessly 14 or through a direct, wired connection 15 to the vehicle's sound system, which may include a radio 16, satellite TV 16A, satellite radio 16B, etc. The audio input for the control unit 11 is obtained either through a directly connected microphone 17, through an existing vehicle hands-free system, or wirelessly though a headset 18 connected to the mobile device 12. The control unit 11 may also have a video output transmitting video received from a video camera 60, or received from a video camera built into mobile device 12. In one example, the control unit 11 receives both audio and video from the video camera 60 or from the mobile device 12.

The control unit 11 connects to the vehicle's battery for power. An AC adapter is available for use at home or in the office. For portable use in other vehicles, an optional "Y" or pass-through cable is available to plug into a cigarette lighter accessory socket for power.

The control unit 11 contains a recessed button 20 which enables the user to do the following: register new or replacement remotes; pair the device with a new mobile device 12; and clear all preferences and reset the device to its factory default settings. The control unit 11 also has a set of four status lights 21 which display the following information: power and system health, vehicle connection status and activity, mobile device connection status and activity, and information access and general status.

In one example, the control unit 11 and the mobile device 12 recognize when the user, and the user's associated mobile device 12, are near to, or have entered the vehicle. This may be accomplished, for example, by Bluetooth pairing of the device and the vehicle, or similar wireless communication initiation protocols. Within this range, the handheld device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile device 12, e.g., headphones 18. Microphones 17 in the vehicle 8 or on the mobile device 12 detect user-generated voice commands. Thus, the user is not required to change modes on the mobile device 12; instead, the control unit 11 and associated mobile device 12, recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile device 12 and user are within a certain distance from the vehicle 8, whereas another user may switch modes only when the mobile device 12 and user have entered the vehicle 8. Further, the user may want to operate the control unit 11 and associated device 12 in a private mode, even if other occupants are in the vehicle 8.

Similarly, the system 10 recognizes when the user leaves the vehicle 8 and the mobile device 12 reverts to a self-contained (normal) mode. The mobile device 12 may also record the vehicle's location when the user leaves the vehicle 8 (based upon GPS or other information). Accordingly, the user can recall the vehicle position at a later time, either on the mobile device 12 or elsewhere on the system, which may aid the user in locating the vehicle 8.

The control unit 11 has multiple USB ports 22. There are standard USB ports which serve the following functions: to enable the user to store preferences, settings, and off-line memos and transcriptions on a standard USB flash drive; to permit future expansion, upgrades, and add-on features (e.g. video camera 60); and to connect an Ethernet dongle for high-speed internet access. In addition, the control unit 11 has a dual-purpose USB 2.0 port which in addition to the features mentioned above, provides USB 2.0 "on-the-go" functionality by directly connecting to the USB port of a notebook computer with a standard cable (e.g. just like connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device uses both authentication and encryption. Voice-based biometrics may also be used to further enhance security.

The user stores his settings in his settings profile 30. This profile 30 may be stored in a database on an Internet server 27. The control unit 11 utilizes the internet access provided by the user's mobile device 12 to download the user's profile 30 via the Internet. The control unit 11 also uses the pairing information from the mobile device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the user. The user can access and modify their profile 30 on the Internet server 27 through either the Internet using a web-based interface 28, or through a simple interface directly accessible from the associated mobile device 12. Alternatively, the profile 30 is always stored and modified on the control unit 11 only and can be accessed via the mobile device 12 and/or via a USB connection to a laptop or desktop computer.

The user may also store a license plate number for the vehicle 8 in the settings profiles 30. In this case, the server 27 will assume that the user is in the vehicle 8 with that license plate number whenever the user's mobile device 12 connects with any control unit 11. Alternatively, the server 27 may assume that the user is in the vehicle 8 with that license plate number only when the user's mobile device 12 is connected to that particular control unit 11, which is assumed to stay in the vehicle 8 with that license plate number.

Figure 2:
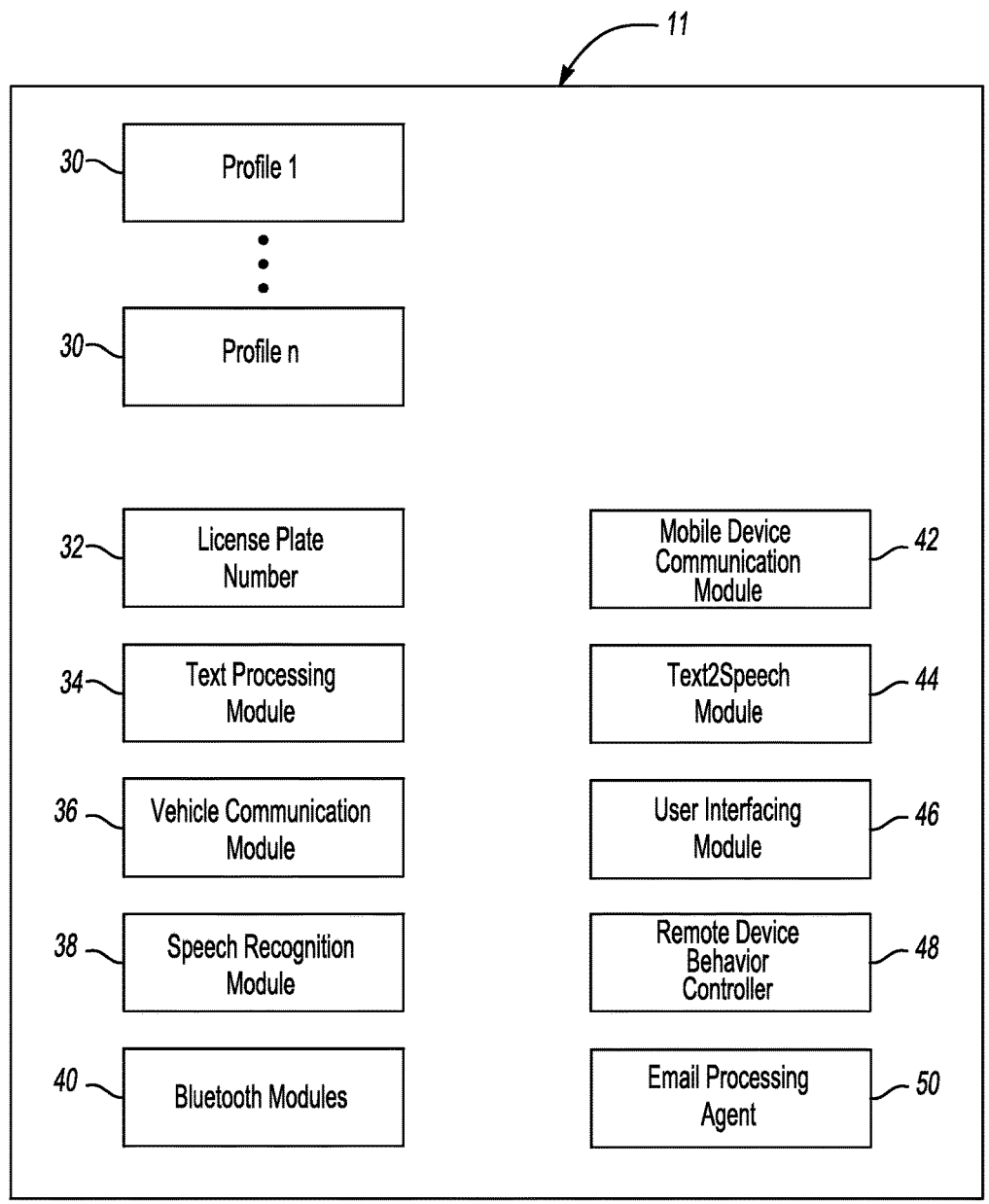
FIG. 2 is a partial schematic of the control unit of FIG. 1.

Alternatively, referring to FIG. 2, the user may store a license plate number 32 in the control unit 11. In this case, the server 27 will assume that any user whose mobile device 12 connects with that control unit 11 is in the vehicle 8 with that license plate number 32. If the control unit 11 is moved to another vehicle, the user can change the license plate number 32 stored on the control unit 11.

As shown in FIG. 2, the control unit 11 includes a text processing module 34, a vehicle communication module 36, a speech recognition module 38, Bluetooth (or other wireless communication) modules 40, a mobile device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 uses a data mining algorithm to determine if any parts of the email should be excluded (e.g. a lengthy signature).

Communication with other Vehicles

Figure 3:
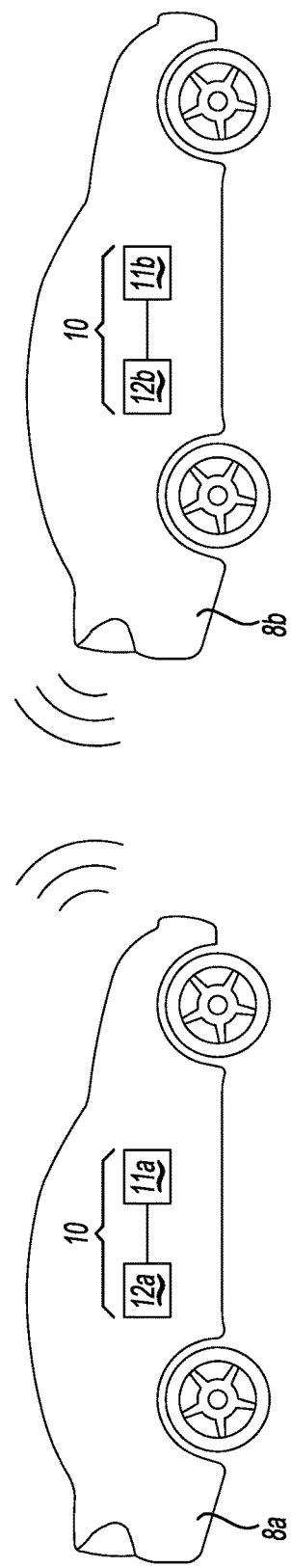
FIG. 3 shows communication between communication systems in two vehicles.

The system 10 is operable to wirelessly communicate with systems 10 on other vehicles. Referring to FIG. 3, a first vehicle 8a includes a first control unit 11a and a first mobile device 12a, and a second vehicle 8b includes a second control unit 11b and a second mobile device 12b. Using the control unit 11a, a user in vehicle 8a ("inviter") can initiate a communication with a user in vehicle 8b ("invitee"). The "users" can be drivers or passengers in the respective vehicles 8.

The server 27 runs one or more applications for decoding a vehicle license plate number to an addressable piece of data (e.g. IP address, CIM, satellite receiver identification number, etc.). A license plate of the inviter vehicle 8a may be stored in the user settings profile 30 for user in the vehicle 8a. In one example a user may store multiple license plates in their profile if they own multiple vehicles, such that the control unit 11 can seamlessly be moved between vehicles. In one example, if the invitee vehicle 8b does not have a registered license plate, the server 27 cannot identify the vehicle 8b and the invitation is automatically rejected.

Each mobile device 12a-b may use an onboard localization device (e.g. GPS module) for determining the location of the mobile device 12a-b and therefore the location of the user and the vehicle 8. This location is sent to the control unit 11 and/or the server 27. The server 27 may track the locations of vehicles 8, control units 11 and users. The locations could be used when sending an invitation message to "nearby vehicles" such that the server 27 determines which vehicles are in proximity to the inviting vehicle by comparing GPS positions.

The inviter could enter a license plate of the vehicle 8b to identify the vehicle 8b (including, optionally, identification of the jurisdiction that issued the license plate). This information could be spoken and converted to text using the speech recognition module 38, or could be entered using a keyboard (e.g. keyboard on mobile device 12a). An invitation message may then be transmitted to the identified vehicle 8b.

The locations of the vehicles 8 stored on the server 27 could also be used in combination with the license plate number entered by the user. For example, the server 27 may only permit invitations to be sent to vehicles 8 within some predefined distance of the inviter, thereby reducing invitations sent to incorrectly entered license plate numbers.

In one example an invitation message is sent to only a vehicle corresponding to a specified license plate. The user may also be able to choose to send an invitation message to all vehicles within a predefined vicinity of the invitee vehicle. The invitation message could include information such as a license plate number of the invitee vehicle, the communication addressing information of the inviter (e.g. name, nickname, etc.), and a description of the inviter's vehicle (e.g. brand, color, etc.).

Once the invitee vehicle 8b receives a communication invitation from the inviter vehicle 8a, the control unit 11b notifies the user of the invitation. If the invitation is accepted by the invitee user, a chatting connection is established between the control units 11a-b so that both users can chat using voice, text (e.g. using speech recognition module 38 or using a keyboard of mobile device 12), or video (e.g. using video camera 60, or using video functionality of mobile device 12).

The systems 10 may communicate using a variety of communication means. The control units 11 can communicate with one another via text chat, speech to text, video chat, or voice over IP either directly with one another, vehicle to vehicle, such as by radio frequency, Bluetooth, Wi-Fi, citizen's band ("CB") radios, or other comparable short range communication devices. More preferably, the communication (text chat, speech to text chat, video chat, or voice over IP) can take place via the server 27.

The users may speak their communication, which is converted to text by the speech recognition module 38 and sent to the other user as text. At the recipient user's control unit 11, the text is converted back to speech and played for the recipient user. These communications are prioritized along with all of the other communications and messages that may be directed to the user. In other words, navigation instructions, a phone call or another chat message may take priority over the chat message. Thus, playing the chat message (in text form) for the recipient user may be delayed.

The users may also initiate a voice communication session, where the speech from each user is sent from the control unit 11 to the server 27 (e.g. via VOIP) and then to the other control unit 11. Thus, a voice communication can be initiated with a user in another vehicle 8 without knowing the name or telephone number of a user in the vehicle 8.

The communications may be logged on the server 27 (if used) and/or locally on the control units 11. In one example, the mobile devices 12*a-b* correspond to Bluetooth headsets each operable to communication with a Bluetooth receiver in the other of the two vehicles 8*a-b*. In one example, the mobile devices 12*a-b* communicate via satellite, with or without using cellular towers.

The inter-vehicle communication features discussed above may be useful for a variety of reasons. For example, a user of vehicle 8*a* may wish to notify a user of vehicle 8*b* that a tire on vehicle 8*b* is partially deflated. As another example, a user of vehicle 8*a* may wish to engage in a social conversation with a user of vehicle 8*b*. As another example, a user of vehicle 8*a* may wish to notify a user of vehicle 8*b* of hazardous road conditions, or of impending traffic.

Hands-Free Email

One feature of the system is hands-free email. Using the text-to-speech module 44, the control unit 11 can read email to the user. When new email arrives, the control unit 11 uses the profile 30 to guide an intelligent filtering and prioritization system which enables the user to do the following: ensure that emails are filtered and read in order of priority, limit the frequency of new email interruptions, send automatic replies without user intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 provides intelligent email summarization in order to reduce the time required to hear the important content of email when read out loud.

The user can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the user to hear only the most important content or meaning of an email. Another email-related feature is the ability to download custom email parsers to add a new dimension to audible email, and to parse informal email styles (e.g., 18r, ttyl).

The hands-free email functionality includes content-rich notification. When providing notification of a new email, the control unit 11 provides a quick summary about the incoming email, enabling the user to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile device 12. The control unit 11 uses known contact names to identify the parties of an email instead of just reading the cryptic email addresses out loud.

In addition to reading email, the control unit 11 also enables the user to compose responses. The user can send a reply using existing text or voice templates (e.g. "I'm in the car call me at 'number,'" or "I'm in the car, I will reply as soon as I can"). New emails can also be created and sent as a voice recording in the form of a .wav, .mp3 or other file format. The user is also provided the option of calling the sender of the email on the phone using existing contact information in the address book, or responding to meeting requests and calendar updates (e.g. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the user.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or a user headset 18. If an expected important email arrives while the user is on the phone, an "email-waiting" indicator (lights and/or subtle tones) will provide subtle notification without disrupting the conversation. A headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the user's profile. Normal forwarding rules will resume when leaving the vehicle.

The control unit 11 also provides voice activated answering and calling. When the control unit 11 announces a telephone call, the user can accept the call using a voice command. The user can use voice commands associated with either contacts in an address book or with spoken phone numbers to place outgoing telephone calls (e.g. "Call Krista").

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile device 12 automatically resumes normal operation. Email reading can also be paused to accept an incoming phone call, and can be resumed when the call is complete.

In addition, the user can communicate with any contact through email, a phone call, or an SMS text message simply by speaking. The control unit 11 provides enhanced information for incoming telephone calls. The name and number, if available, are read out loud to ensure that the user knows the caller without looking away from the road. A nickname, or other information located in an address book, may also be used for notification.

The user can also reply to an email with a phone call. While reading an email, the user can contact the sender by placing a telephone call with address book information. When a phone call is made, but the line is busy or no voicemail exists, the user is given the option of sending an email to the same contact instead. This eliminates the need to wait and try calling the person again.

Within their profile 30, the user can prioritize between email and phone calls, so that an important email will not be interrupted by a less important phone call. In addition, custom .mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile device 12. The control unit 11 reads the subject and time of calendar reminders out loud, and the user can access additional calendar information with voice commands if desired. The user can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The user can also store location-based reminders, which will provide reminders the next time the vehicle is present in a specified geographical area, and automatically receive information associated with nearby landmarks. In addition, the user could plan and resolve meeting issues by communicating directly with other participants' location-aware devices.

Do Not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available. In one example, the control unit 11 automatically rejects communication attempts from neighboring control units 11 such that no chatting is initiated in the "do not disturb" mode.

Integrated Voice Memo Pad

Another feature of the present invention is the integrated voice memo pad, which enables the user to record thoughts and important ideas while driving so they will not be forgotten while parking or searching for a memo pad or device. Memos can be transferred via email to the user's inbox, or to any of the user's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the example embodiment of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (e.g., .wav, .mp3), HTML (e.g. encoded emails and web sites), plain text portions of Word and PowerPoint files, Adobe Portable Document format (PDF), OpenDocument formats, and compressed and/or encoded attachments of the above formats (e.g. .zip).

Third, the device provides environment and location awareness. This includes current location and navigation information, local weather conditions, vehicle status, and relevant location-specific information (e.g. where is "work", where is "home?").

Fourth, the control unit 11 provides remote access to information. This includes existing news sources (e.g. existing RSS feeds) and supported websites. This also includes subscription to value-added services including: weather, custom alerts (e.g. stock price triggers), traffic conditions, personalized news, e-books (not limited to audio books, but any e-book), personalized audio feeds, and personalized image or video feeds for passengers. The system obtains, translates, and provides personalized news content in audible form within a vehicle without explicit user requests. An individual may set their preferences by selecting from a set of common sources of information, or by specifying custom search criteria. When new information is available and relevant to the individual's preferences, it is read out loud to the individual when appropriate. Appropriate instances can be specified by the individual using a combination of in-vehicle presence detection, time-of-day, and importance of the information relative to other personal events including email, phone calls, meetings and text messages.

Individual preferences are fine tuned using negative feedback as specific stories and events are read out loud to the individual. This negative feedback is used in combination with the individual's personal search criteria to refine the relevance of future personalized content. In addition to online news content, the individual may also select other available online content, including stock market events and general web search terms. Some examples of personalized content include:

Weather
Custom alerts (e.g. stock price triggers)
Traffic conditions
Personalized news
e-books (not limited to audio-books, but any e-book)
Personalized audio feeds
Personalized image or video feeds for passengers All text information is parsed and translated to optimize intelligibility before being read out loud to the individual.

Notification rules can be set by the individual using any combination of time interval, in-vehicle presence, and importance of the news event with appropriate location aware hardware support, notification rules can also include location based constraints. Desired news content can be selected using predefined templates or custom search terms.

User feedback is incorporated to maintain historical information about the news events to which the individual listens, news events that are interrupted, and news events to which the individual provides explicit feedback. This information is used to help filter subsequent news information and provide the user with more relevant news information the longer they use the service.

To minimize the volume of wireless data transfer, all searching and selection of relevant content is performed using a server with a wired data connection. Appropriate instances to present new information are detected locally (within the vehicle). When an appropriate instance occurs, a short request is sent to trigger the transmission of the most recent personalized news information from the search server.

Personalization

Another feature in the example system 10 is extensive personalization and customization for email handling, email notification, time-sensitive rules, vehicle-aware actions, text-to-speech preferences, and multiple user support.

The email handling settings in the user's profile 30 allow the user to use the control unit's 11 built-in intelligent email parsing and processing. This enables the user to avoid receiving notification for every trivial incoming email. Some of the intelligent parsing features include automatic replies, forwarding and prioritization based on content and sender, and substitution of difficult phrases (e.g. email addresses and web site URLs) with simple names and words. The user can also choose to hear only select information when a new email arrives (e.g. just the sender name, or the sender and subject, or a quick summary). Email "ring tones" are also available for incoming emails based on sender or specific keywords. Prepared text or voice replies can be used to send frequently used responses (e.g. "I'm in transit right now"). Some prepared quick-responses may be used to automatically forward an email to a pre-selected recipient such as an administrative assistant. The user can also set up both email address configuration and multiple email address rules (e.g. use "me@work.com" when replying to emails sent to "me@work.com," but use "me@mobile.com" when composing new emails).

The user can also customize notification. This includes prioritizing emails and phone calls based on caller or sender and subject (e.g. never read emails from Ben out loud, or if an email arrives from George, it should be read before others). The user can also limit the amount of notifications received (e.g. set minimum time between notifications, or maximum number of emails read in a short period of time).

Time-sensitive rules in the profile 30 may include options such as "don't both me in the morning," or "only notify me about incoming email between these hours." The user can also configure audible reminder types based on calendar and scheduling items from the mobile device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile devices are present (e.g. switch to silent "do not disturb" mode, or take no action).

The text-to-speech settings for the device are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The user can set personal preferences for pronunciation of specific words, such as difficult contact names, and specialized acronyms or symbols, such as "$H_2O$." By default, most acronyms are spelled out letter by letter (e.g. IMS, USB).

Information about specific words or phrases can be used to enhance both speech recognition performance and text-to-speech performance, and this includes context sensitive shortcuts. For example, nicknames should be expanded into an email address if the user is dictating an email. In addition, email addresses should be expanded to a common name when found. The user can also set custom voice prompts or greetings.

The device also features multiple user support, wherein multiple people can share the same device. The device automatically identifies each person by their mobile device 12, and maintains individual profiles 30 for each user.

Connectivity

The connectivity functionality of the control unit 11 enables it to function as a hands-free audio system. It interacts with supported Bluetooth hands-free devices, including but not limited to Bluetooth enabled vehicles (e.g., HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. Retrofit solutions will also be available for existing vehicles lacking wireless connectivity in the form of an optional after-market Bluetooth kit.

The system 10 may include a remote control 26 for accessing the control unit 11. Emergency response support is available for direct assistance in emergencies, providing GPS location information if available. The user could also use the control unit 11 through an advanced wireless audio/visual system, including such features as streaming music and providing image content (e.g. PowerPoint, images attached in emails, slideshows). Integrated steering-wheel column buttons is also an available option.

The control unit 11 can also connect to a computer and external devices. This includes personal computers with Bluetooth to conveniently exchange information over a personal area network (PAN). This also includes GPS devices (with Bluetooth or other wireless or wired connectivity) for location awareness. This also includes storage devices (Bluetooth or other wireless or wired) for personal e-book libraries, or to manage offline content with the unified hands-free interface. An optional cable will be available for controlling an iPod or other music player with voice commands. Through the device's USB ports, the user can expand the functionality of the device by attaching such items as a USB GPRS/EDGE/3G device for direct mobile access without a separate mobile device, or a USB WiFi for high-speed Internet access.

Upgradeability and Expansion

The user may add future enhancements to the control unit 11 wirelessly using standard Bluetooth enabled devices. This includes support for wireless transfer with a desktop or notebook computer to transfer and synchronize information. Advanced Bluetooth profile support (e.g. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (e.g. similar to connecting a digital camera or GPS unit directly to a computer).

Media Exchange

As indicated, the control unit 11 also plays audio files, such as .mp3s, .ways, .AIFFs, and other compressed or uncompressed audio formats, as well as video files. The user can request any media content (e.g., songs, video, books, etc) in several ways. The user interfaces with the control unit 11, which sends an email request to the server 27 (or a dedicated server) via the mobile device 12 with as much information as the user can include, such as author, singer, title, media type, etc. The control unit 11 could generate the email using speech to text conversion. The control unit 11 could alternatively attach an audio file with a voice request from the user for the media content (again identifying author, singer, title, media type, etc). The control unit 11 could also send an audio file of the user humming a desired song.

The entertainment system components 16, 16A, 16B may send content info (e.g. RBDS/RDS info) identifying the song title and artist currently being played to the control unit 11 (such as via lines 54). Alternatively, the control unit 11 can listen to the audio being played over the speakers (such as via line 15 or via microphone 17). If the user indicates that he likes the currently-played media content (such as by speaking, "I like this song," or "I like this video"), the control unit 11 identifies the currently-played media content (which identification it may already have directly, or which it can obtain by sampling the media content via line 15 or via microphone 17 and sending it to a server, such as server 27, for identification). After the control unit 11 has determined the identity of the media content, the control unit 11 may recite the information to the user, including a cost for purchasing the media content and offering the option to purchase the media content. The control unit 11 may also ask the user what format to purchase the media content (e.g., .mp3 by download, CD by mail, DVD by mail, etc), whether to purchase only the specific media content or to purchase an entire album containing the media content, whether to explore other media content by the same artist, etc. Upon verbal request from the user, the control unit 11 sends the request of the media content, such as by sending an email request to the server 27.

Whatever the format of the request, the server 27 will parse the email request to identify the requestor and to determine the desired media content. Some assumptions may be made, for example, if the user only specifies an author or singer, that singer/author's most recent work is provided.

Once the media content is purchased, the server 27 retrieves the media content from its own databases or other databases 52 accessible over the internet (or other wide area network). The server 27 then attaches the requested media content to an email containing identifying information and sends it to the user. The control unit 11 receives the email via the mobile device 12, identifies the response to the request, stores the media content in storage on the control unit 11 and begins playback. Optionally, when appropriate, the server 27 may charge the user's account for the purchase of the media content (the user's account may be linked to a credit card, bank account, or other payment method).

After retrieval and storage, the control unit 11 identifies the media content that was received to the user by announcing the title, author/singer, media type, etc. and asking the user if the user wants the control unit 11 to play the media content, archive the media content or ignore the media content. Playback can be controlled by voice commands (fast forward, rewind, repeat, pause, play, etc).

As an option, each of the accounts 30 further includes an associated media storage account 31 in which any media content requested by the user is stored before a copy is forwarded to the user's control unit 11. This provides a backup of the media content and facilitates sharing the media content with others.

The user can forward media content to other users by interfacing with the control unit 11 to generate an email to the server 27 that specifies the content (as above) and also specifies the person or account to whom the media content will be forwarded. If the content is already stored in the sender's media storage account 31, the server 27 will send a copy to the recipient's media storage account 31 and email a copy to the intended recipient. If the content is not already stored in the sender's media storage account 31, the server 27 will obtain a copy (as above) and put it in the recipient's media storage account 31. The server 27 will charge the sender's account for the content sent to the recipient, as appropriate based upon licensing arrangements. The recipient's control unit 11 (or similar) would announce the content and the sender and ask to play the content.

The media may be provided in a proprietary format readable only by the server 27 and authorized control units 11.

Each user's media storage account 31 stores all media content requested by the user and all media content received from others. When the control unit 11 detects the user's mobile device 12 connected to the control unit 11, a message is sent to the server 27 indicating that the user can now receive media content. Server 27 will provide a report that the control unit 11 will read to user listing media content in the media storage account 31. The user can choose media content to play, to archive onto the control unit 11, reject, or postpone receiving. Each user has their own media storage account 31, as they have mailboxes. The user can check the associated media storage account for songs (or other media content), browse titles and choose to play choices, or forward media content in the media storage account 31 to a person he has in his contact list.

This feature provides a backup of the user's media content, provides an easy way for the user to request and play media content in the vehicle and provides an easy way for the user to share media content with other users.

The control unit 11, mobile device 12 and server 27 each include a processor and memory and each is suitably programmed to perform the functions described herein.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for communicating including the steps of:
receiving speech from a sender, the speech containing a recipient license plate number of a recipient vehicle;
converting the speech to text to discern the recipient license plate number;
associating the recipient license plate number with an electronic device in the recipient vehicle;
receiving a speech communication from the sender;
converting the speech communication to a text communication; and
transmitting the text communication to the electronic device in the recipient vehicle based upon the recipient license plate number;
wherein the step of associating is performed by a server at a location remote from the recipient vehicle and the sender.

2. The method of claim 1 wherein the electronic device is a user mobile device.

3. The method of claim 1 wherein the electronic device is a control unit in the recipient vehicle.

4. The method of claim 3 wherein the control unit communicates with a mobile device associated with a user.

5. The method of claim 1 further including the step of converting the text communication back to speech communication and playing the speech communication in the recipient vehicle.

6. The method of claim 1 wherein the communication is a voice communication provided to the recipient vehicle via a server.

7. The method of claim 1 further including the step of logging the communication.

8. The method of claim 1 further including the step of storing the recipient license plate number on the electronic device, wherein the electronic device is installed on the recipient vehicle.

9. The method of claim 1 further including the steps of:
storing a plurality of user profiles, each having at least one associated license plate number and each having an associated electronic device.

10. The method of claim 9 wherein at least one of the user profiles has a plurality of license plate numbers associated therewith.

11. The method of claim 1 further including the steps of determining a geographical location of the recipient vehicle and directing the communication to the electronic device based upon the geographical location of the recipient vehicle.

12. The method of claim 1 further including the step of prioritizing the communication in the recipient vehicle relative to at least one other communication or notification, wherein the step of prioritizing includes the step of delaying presentation of the communication in the recipient vehicle until after the at least one other communication or notification.

13. The method of claim 12 wherein the at least one other communication or notification is an email.

14. The method of claim 12 wherein the at least one other communication or notification is a navigation instruction.

15. The method of claim 1 wherein the communication is an invitation to communicate, the method further including the steps of receiving an acceptance of the invitation to communicate and initiating a communication session with the electronic device in the recipient vehicle.

16. A method for communicating including the steps of:
receiving a speech communication from a first user;
converting the speech communication to a text communication;
transmitting the text communication to a second user;
prioritizing the text communication to the second user relative to at least one other communication to the second user or notification to the second user, wherein the step of prioritizing includes prioritizing presentation of the text communication to the second user over presentation of the at least one other communication or notification to the second user; and
converting the text communication to speech and playing the speech for the second user.

17. The method of claim 16 wherein the at least one other communication or notification is an email.

18. The method of claim 16 wherein the at least one other communication or notification is a navigation instruction.

* * * * *